No. 783,058. PATENTED FEB. 21, 1905.
A. MICHELIN.
LEVER APPARATUS FOR MOUNTING PNEUMATIC TIRES UPON WHEEL RIMS.
APPLICATION FILED DEC. 14, 1904.
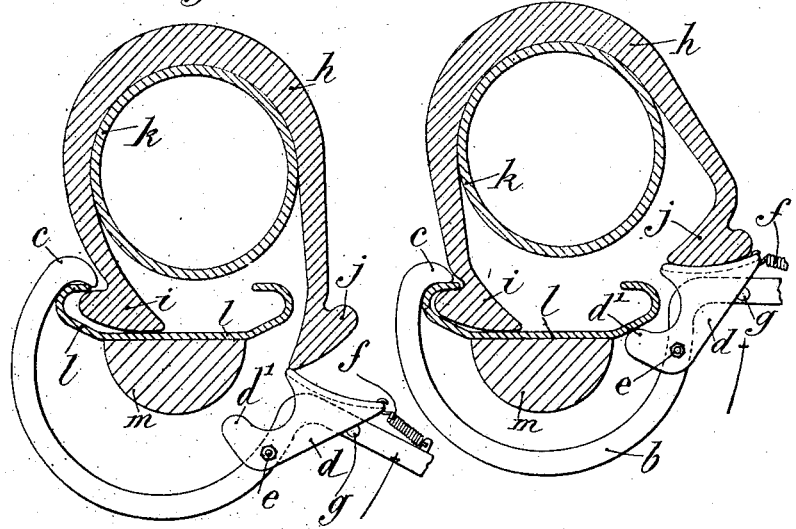
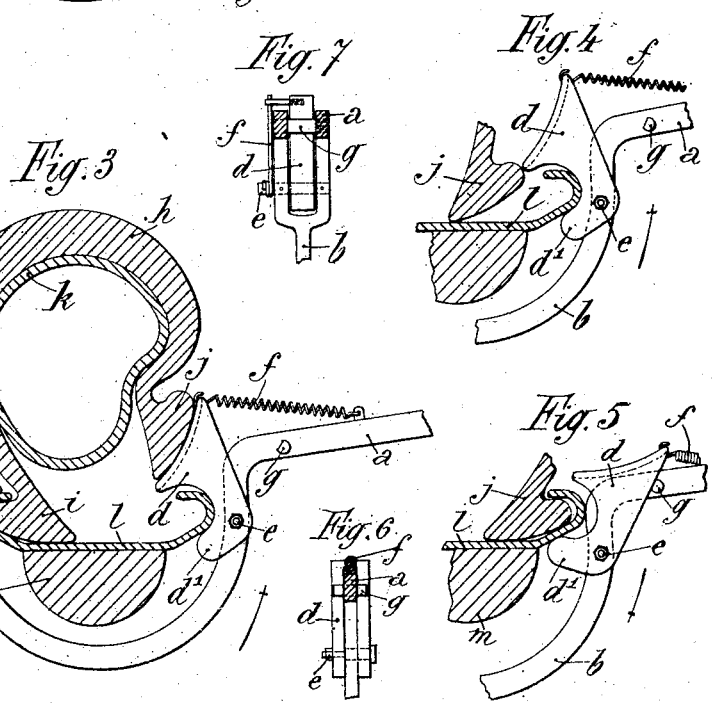

No. 783,058.

Patented February 21, 1905.

UNITED STATES PATENT OFFICE.

ANDRÉ MICHELIN, OF PARIS, FRANCE.

LEVER APPARATUS FOR MOUNTING PNEUMATIC TIRES UPON WHEEL-RIMS.

SPECIFICATION forming part of Letters Patent No. 783,058, dated February 21, 1905.

Application filed December 14, 1904. Serial No. 236,814.

*To all whom it may concern:*

Be it known that I, ANDRÉ MICHELIN, engineer, a citizen of the Republic of France, and a resident of 105 Boulevard Iéreire, Paris, France, have invented new and useful Improvements in Lever Apparatus for Mounting Pneumatic Tires upon Wheel-Rims, of which the following is a specification.

When mounting a pneumatic tire upon the wheel-rim of a motor-car or other vehicle, the bringing into position of the second beaded edge of the cover necessitates a very careful operation, and in the case of large pneumatic tires that have not yet been in use it requires considerable force. In order to cause the bead of the cover edge to pass into the corresponding groove of the rim by the means at present employed by chauffeurs, it is necessary to introduce a flat lever under the beaded edge which projects over the rim and to cause it to bear against the edge of the rim. It will be readily seen that the pneumatic tube is very close to this edge, which it even touches in many cases, and in particular if after considerable use the pneumatic tube has attained a diameter larger than that which it had originally. It will be evident that when an upward motion is imparted to the lever the pneumatic tube may become interposed between the bottom surface of the rim and the end of the lever, and thus risks becoming cut by the pressure exerted by the lever. In order to avoid such a contingency, one is obliged to operate with very great care and to push back the pneumatic tube, so as to prevent it from passing under the point of the lever. Notwithstanding all these precautions it frequently happens, even to the most experienced operators, to damage the pneumatic tube by means of the lever. On the other hand, the placing in position of the second beaded edge by means of the ordinary levers frequently requires the exercise of considerable force, as already stated. Such, for example, is the case with large pneumatic tires having a diameter of from one hundred and five to one hundred and twenty millimeters, or even those of eighty-five or ninety millimeters, which have never before been mounted. This difficulty of mounting is partly due to the circumstance that the beaded edge slips on the lever, so that the point is directed toward the operator instead of being directed toward the wheel-rim. In this position it is evidently impossible to cause the bead to enter the groove of the rim. It is necessary to bring it back into the normal position by up and down movements of the lever, which are liable to damage the beaded edge.

The present invention relates to a special construction of lever device which avoids the two above-named inconveniences and which possesses the advantage over levers of ordinary construction of requiring a much less powerful effort for obtaining the desired result and of not damaging the beaded edge of the covering, which is only subjected to a minimum degree of tension.

I will describe my said invention with reference to the accompanying drawings, in which—

Figures 1 to 5 show the improved lever device in side view in the different positions into which it has to be successively brought for bringing into position in the wheel-rim the second beaded edge of a pneumatic-tire covering. These figures show, either completely or partially, in transverse section the wheel-rim, the pneumatic tube, and the cover, the two last-named parts being shown in each of the figures in the position which corresponds to that of the lever. Fig. 6 shows a transverse section of a lever in which the pivoted tumbler is made forked, so as to fit on both sides thereof. Fig. 7 shows a cross-section of a modification in which the lever is made with a looped part in which the tumbler is situated.

The improved lever device consists, first, of a lever *a*, the end *b* of which is curved and terminates in a hook *c*, with rounded edges; secondly, of a movable tumbler-lever *d*, having somewhat the shape of a gun-trigger and which can pivot upon a pin *e*, fixed in the lever at the beginning of the curved part thereof. This tumbler-lever can be made forked, so as to fit over both sides of the lever, as shown at Figs. 1 to 6, or it may be fitted into a looped part of the lever, as shown at Fig. 7. It is acted upon by a spring *f* of any suitable form that will tend to bring it against a stop *g*, fixed on the lever *a*.

In Fig. 1 the cover h of the pneumatic tire has its one beaded edge, i, placed in position, the second beaded edge, j, being free. k is the pneumatic tube. l is the steel wheel-rim fixed to a wooden inner rim m. For bringing the second beaded edge, j, into position on the wheel-rim the lever a is placed so that its hook c bears upon the top of that edge of the wheel-rim with which the beaded edge is engaged. The lever is then moved upward, as indicated by the arrow, until the tumbler-lever d comes in contact with the point of the free edge j, as at Fig. 1. In continuing the upward motion the beaded edge is made to bear completely upon the slightly-curved upper face of the tumbler-lever d, as shown at Fig. 2, where the tail d' of the tumbler-lever is at the same time brought in contact with the under side of the wheel-rim l. The upward movement of the lever a being continued, the tumbler-lever d, on the one hand, has its axis e moved upward, while, on the other hand, the tail d' is held back by the wheel-rim, so that the tumbler-lever thus has a turning motion imparted to it, bringing it into the position shown at Fig. 3, and consequently bringing the beaded edge j over the edge of the wheel-rim. When in this position, the beaded edge, in consequence of the compressed condition of the cover, will of itself slide down from the tumbler-lever d onto the bottom surface of the wheel-rim, as shown at Fig. 4, from which position it will then automatically slide to the right hand, and thus assume its normal position in the groove of the wheel-tire, as shown at Fig. 5, after the lever a has been lowered. The lever a is then removed.

The above-described operation is repeated at different parts of the tire, so as eventually to bring the entire beaded edge j of the cover into position.

When a short length of the beaded edge j has been brought into position by means of the lever, as above explained, the cover tends to spring off the wheel-rim. This is prevented by temporarily holding it in position either by hand or by a suitable instrument until a further part of the beaded edge has been brought into the groove.

Having thus described the nature of my said invention and the best means I know of carrying the same into practical effect, I claim—

1. A lever device for mounting pneumatic tires upon wheel-rims, consisting of a lever with a curved and hooked end, adapted to be engaged with one of the edges of the wheel-rim, a tumbler-lever pivoted to the main lever, adapted to engage with the beaded edge of the cover which has to be brought into position on the tire, and having a tail which is adapted to bear against the under face of the wheel-rim, so that, on raising the main lever, the tumbler-lever is turned on its axis, so as to bring the beaded edge into position for engaging with the groove of the wheel-rim, substantially as described.

2. In a lever device for mounting pneumatic tires upon wheel-rims, the combination of a lever a with curved part b terminating in a hook c, a tumbler-lever d pivotally mounted upon lever a, and having a curved surface adapted to engage with the beaded edge of a tire-cover, and a tail d', adapted to engage with the rim of a wheel, a stop on lever a, and a spring tending to bring the tumbler-lever against said stop, substantially as described.

In testimony that I claim the foregoing as my invention I have signed my name, in presence of two witnesses, this 1st day of December, 1904.

ANDRÉ MICHELIN.

Witnesses:
CHARLES ASSI,
JOHN BAKER.